United States Patent [19]

Liskov et al.

[11] 4,006,418
[45] Feb. 1, 1977

[54] QUATERNARY PHASE-SHIFT KEYING WITH TIME DELAYED CHANNEL

[75] Inventors: Nathan A. Liskov, Waltham; William J. Bickford, Weston; Paul J. Tanzi, Wayland, all of Mass.

[73] Assignee: Raytheon Company, Lexington, Mass.

[22] Filed: May 14, 1975

[21] Appl. No.: 577,268

[52] U.S. Cl. .............................. 325/163; 325/126; 332/21
[51] Int. Cl.² ........................................ H04L 27/18
[58] Field of Search ................. 325/30, 49, 50, 60, 325/125, 126, 163; 178/67; 330/5, 34; 332/21, 23 R; 179/15 BT, 15 BC

[56] References Cited

UNITED STATES PATENTS

| 3,378,771 | 4/1968 | Van Gerwen et al. | 325/60 X |
|---|---|---|---|
| 3,423,529 | 1/1969 | O'Neill, Jr. | 325/60 |
| 3,701,020 | 10/1972 | De Vito | 325/126 X |

*Primary Examiner*—Benedict V. Safourek
*Attorney, Agent, or Firm*—David M. Warren; Joseph D. Pannone; Milton D. Bartlett

[57] ABSTRACT

A digital data communication system employing quaternary phase-shift keying for transmission by a microwave radio link. The digital modulation of the quadrature channel is delayed from the in-phase channel by one-half the time duration of a bit so that the transmitted phase does not experience a quantum shift in excess of 90°. This permits the use of an injection locked oscillator as an amplifier of the microwave transmission.

5 Claims, 2 Drawing Figures ns system employing QPSK modulation of a carrier which is derived from a first carrier and a second carrier is quadrature therewith, said first and second carriers being modulated with digital data in a binary phase format of 0° and 180°. In accordance with the invention, a time delay equal to approximately one-half the width of a pulse representing a bit of the digital data is provided between the digital modulation of one of the two carriers and the digital modulation of the second carrier. Thereby, a transition in the phase modulation of one carrier occurs before a phase transition in the modulation of the second carrier. Thus, upon summing to-

QUATERNARY PHASE-SHIFT KEYING WITH TIME DELAYED CHANNEL

BACKGROUND OF THE INVENTION

Digital communication is often accomplished by phase modulation of a carrier with either 0° or 180° of phase shift corresponding to a logic state of 0 or 1. Frequently, two such communication channels utilizing carriers which are phase shifted from each other by 90° are employed. The two channels are summed together to give a resultant carrier which experiences phase modulation of ±45° or ±135°, these four possible phase states representing the two logic states in each of the two channels. The resultant phase-modulated carrier is referred to as being modulated by quaternary phase-shift keying (QPSK). Such a system is described in the book entitled "Data Transmission" by William R. Bennett and James R. Davey which was published by McGraw-Hill Book Company in 1965.

A QPSK modulated carrier is frequently transmitted via a microwave radio link at a carrier frequency of, for example, 10 gigahertz (gHz). In order to provide suitable power of radiated energy in a microwave transmission link, an injection-locked oscillator is often employed. An injection-locked oscillator type of amplifier is convenient to use because of its physically small size, it being composed of, essentially, a diode affixed within a suitably tuned portion of a waveguide with a voltage applied across the diode from an external source of electric power.

A problem arises when the injection-locked oscillator type of amplifier is employed with a QPSK modulated carrier, the problem being that a quantum phase shift of 180° frequently occurs. Such an occurrence is characterized in a typical communication system by a momentary drop in the amplitude of the modulated carrier with the result that the oscillation of the amplifier loses lock with respect to the modulated carrier. Ideally, the injection-locked oscillator is tuned to oscillate at the carrier frequency of the signal to be amplified as this relationship provides for maximum efficiency of the amplification process. Unfortunately, this frequency relationship intensifies the foregoing problem. Attempts to alleviate the problem of offsetting the oscillation frequency from that of the signal to be amplified degrades the quality of the amplification in that there is a loss of phase coherence between the input and output of the amplifier with attendant phase errors. As a result, the usefulness of the injection-locked oscillator is greatly reduced in the situation where it is desired to transmit accurate data via a QPSK modulated carrier.

SUMMARY OF THE INVENTION

The aforementioned problem is overcome and other advantages are provided by a communication system employing QPSK modulation of a carrier which is derived from a first carrier and a second carrier is quadrature therewith, said first and second carriers being modulated with digital data in a binary phase format of 0° and 180°. In accordance with the invention, a time delay equal to approximately one-half the width of a pulse representing a bit of the digital data is provided between the digital modulation of one of the two carriers and the digital modulation of the second carrier. Thereby, a transition in the phase modulation of one carrier occurs before a phase transition in the modulation of the second carrier. Thus, upon summing together the first and the second carriers to produce the QPSK modulated carrier of the microwave link, the quantum phase shifts resulting from the modulation never exceed a value of 90°. A microwave amplifier employing an injection-locked oscillator has been found to respond successfully to phase transitions to 90° and, accordingly, a QPSK communication system employing the interchannel delay of this invention has successfully operated with an injection-locked amplifier.

BRIEF DESCRIPTION OF THE DRAWINGS

The aforementioned aspect and other features of the invention are explained in the following description taken in connection with the accompanying drawings wherein.

DESCRIPTION OF THE PREFERRED EMBODIMENT

Figure 1:
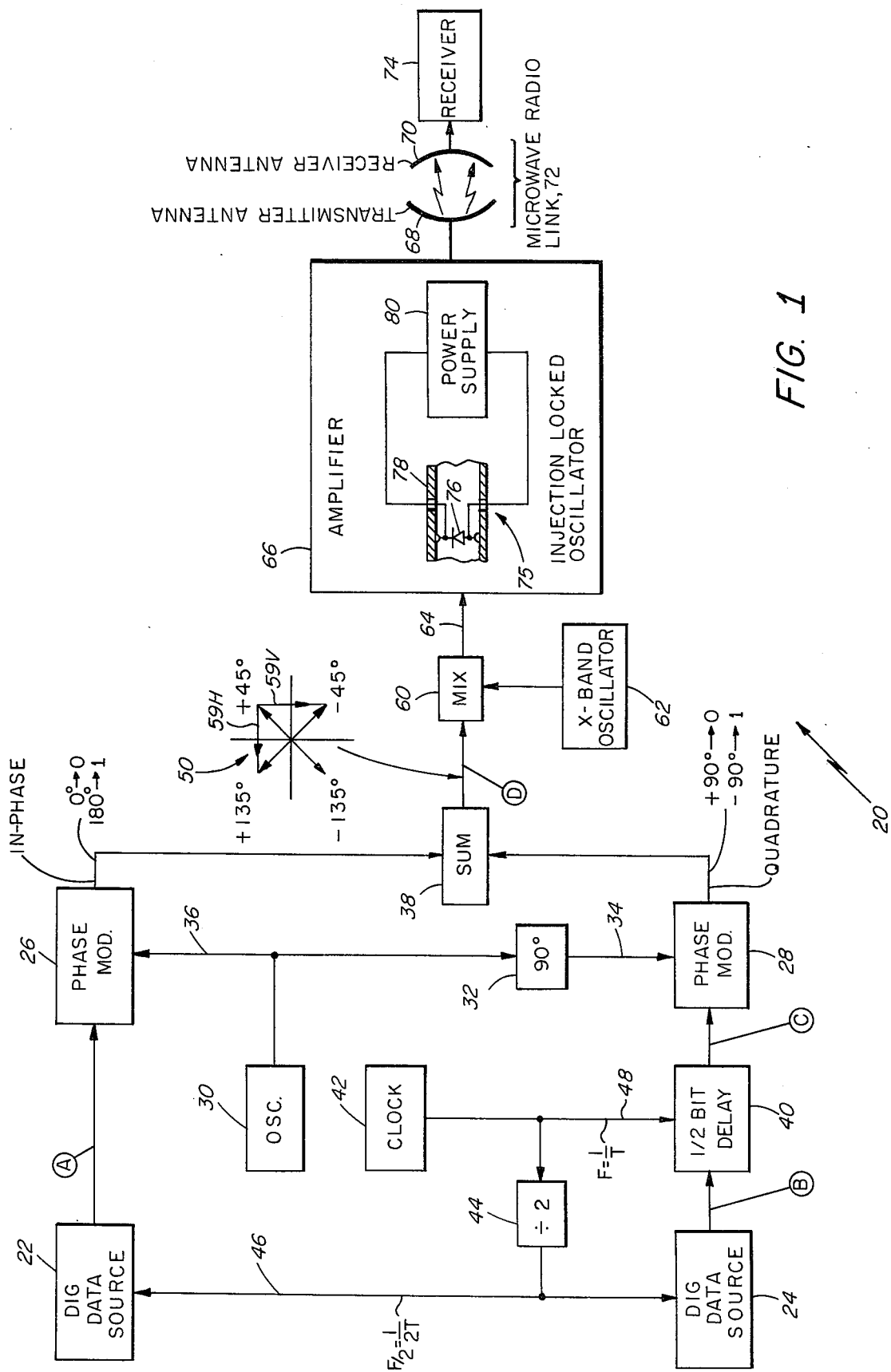
FIG. 1 is a block diagram of a communication system embodying the invention.

Referring now to FIG. 1, there is seen a block diagram of a communication system 20 which comprises two digital data sources 22 and 24, two phase modulators 26 and 28, an oscillator 30 which provides a sinusoidal carrier signal of intermediate frequency to the phase modulator 26, a phase shifter 32 for coupling the carrier from the oscillator 30 to the phase modulator 28, and a summer 38 for summing together the output signals of the modulators 26 and 28. The phase shifter 32 imparts a phase shift of 90° to the carrier of the oscillator 30 and provides a reference carrier on line 34 to the modulator 28 which is in phase quadrature to the reference carrier on line 36 applied to the modulator 26.

In accordance with the invention, there is provided a delay unit 40 for coupling digital data from the source 24 to the modulator 28. The digital data from both the sources 22 and 24 is in the form of binary data having logic states of 0 and 1 which correspond respectively to a low voltage and a high voltage. A clock 42 provides clock pulses at a frequency F and period T, these clock pulses being coupled by a divider 44 to the data sources 22 and 24 for synchronizing their operation. The divider 44 divides the rate of clock pulses by two so that the clock pulses coupled on line 46 to the sources 22 and 24 occur at one-half the rate of clock pulses coupled via the clock 42 along line 48 to the delay unit 40. The binary data signals of the source 22 are clocked onto line A by the clock pulses on line 46 and, similarly, the binary data signals of the source 24 are clocked onto line B by the clock pulses on line 46. The binary data of line B is delayed by a duration of one-half the duration of one bit of the binary data before being coupled via line C to the modulator 28.

The delay unit 40 is in the form of a single cell shift register which is clocked by pulses on line 48 at twice the rate of the clocking of the digital data by the pulses on line 46. Each bit of the digital data has a duration of 2T while the duration of the delay is T. Thus, each time a bit of digital data appears on line B, the same bit reappears on line C after a delay of T seconds.

The modulator 26 modulates the phase of the carrier of line 36 with the binary formatted digital data of line A while the modulator 28 modulates the carrier on line 34 with the binary formatted data on line C. The modulator 26 provides a phase shift of 0° for a logic level of 0 and a phase shift of 180° for a logic level of 1 of the digital signal of line A. The modulator 28 operates in an analogous manner but, since the phase of the carrier on line 34 has already been shifted by 90° by the phase shifter 32, the resultant phase appearing at the output of the modulator 28 has phase shifts of +90° and −90° corresponding respectively to logic states of 0 and 1 of the digital signal on line C. The sum of the outputs of the two modulators 26 and 28 provided by the summer 38 appears on line D and, as is seen by the graph 50, has four possible phase states. These four phase states are ±45° and ±135°.

Figure 2:
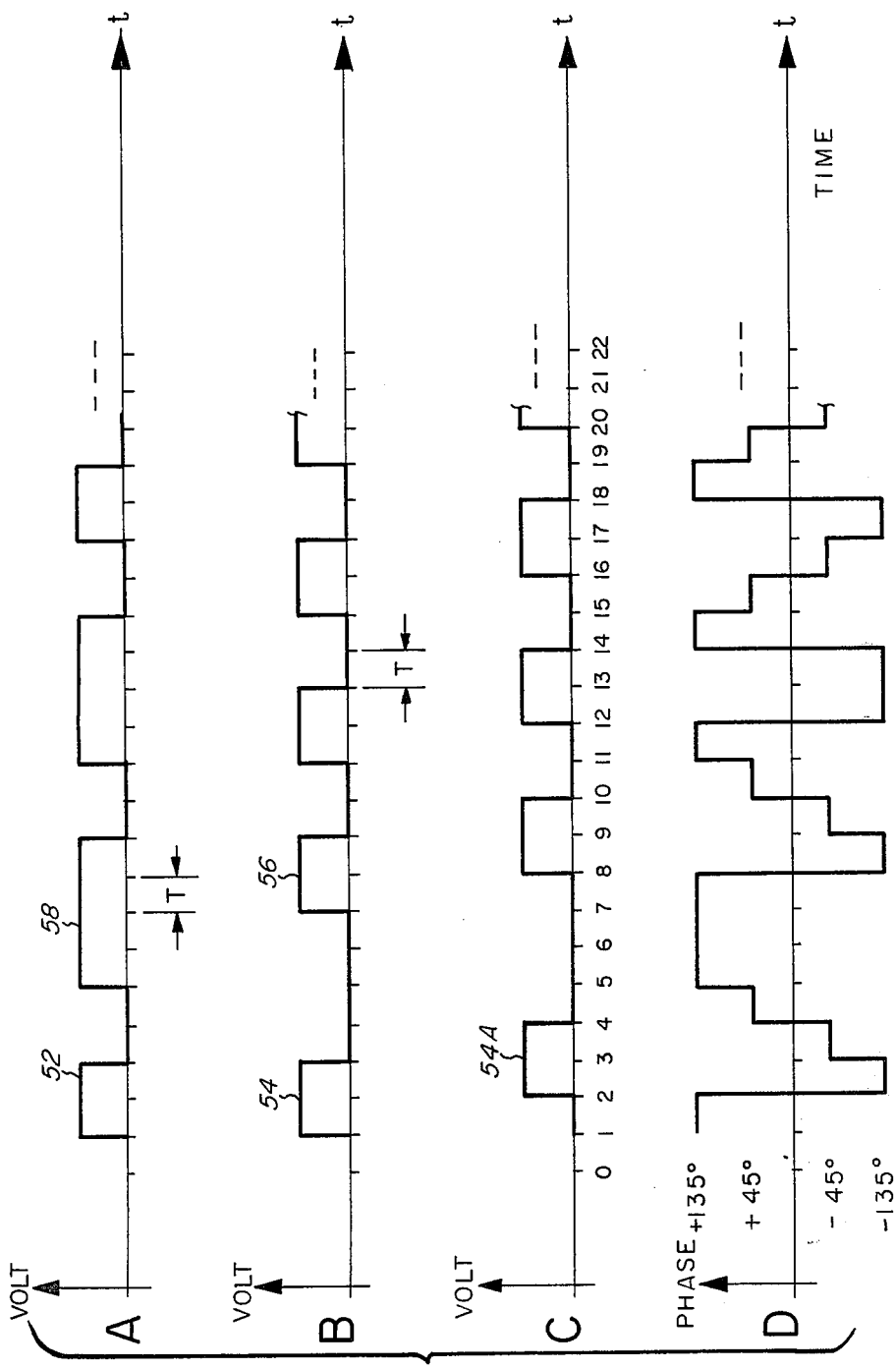
FIG. 2 is a timing diagram useful in explaining the operation of the system of FIG. 1.

Referring now to FIG. 2. the signals on the lines A, B, C and D are shown respectively in the four graphs labeled A, B, C and D. In the graphs A, B and C, the vertical axes represent voltage while in graph D the vertical axis represents phase angle. The horizontal axis in each of the four graphs represents time with the intervals of time being in units of T, the period of the clock pulses on line 48 of FIG. 1. For convenience, numerals designating the time intervals are presented in graph C, it being understood that the same time scale is utilized in all four graphs.

The width of a single bit of the digital data is seen to have a duration of 2T as shown by the pulses 52 and 54 in graphs A and B. The space 56 in graph B represents two successive bits of the binary formated data in which each of the bits has a logic state of 0. Graph C is seen to have the same sequence of digital pulses as does graph B but, the pulse train of graph C is seen to occur T seconds later than the pulse train of B, the delay of T seconds being provided by the delay unit 40 of FIG. 1. Thus, the pulse 54A of graph C is seen to be delayed by one-half the pulse width from the corresponding pulse 54 of graph B.

As noted herein above, the pulses in graph A, such as the pulses 52 and 58 representing a logic state of 1, are represented by a phase modulation of 180° while the logic states of 0 are represented by a phase modulation of 0, this being seen as the in-phase input to the summer 38 of FIG. 1. Similarly, the pulse train of graph C has its logic levels of 1 and 0 represented respectively by phase shifts of +90° and −90°, this being seen as the quadrature input to the summer 38 of FIG. 1.

The four phase states represented pictorially in the graph 50 of FIG. 1 for the phase modulator signal on line D is portrayed as a function of time and graph D of FIG. 2. With respect to the graphs of FIG. 2, from time $t=1$ until $t=2$, the two modulated carriers, which are of equal amplitudes and have phase shifts of 180° and 90° respectively in the in-phase and quadrature signal inputs to the summer 38, are combined in the summer 38 to result in a sinusoid having a phase angle of 135°. From $t=2$ until $t=3$, the in-phase signal corresponding to graph A contributes 180° while the quadrature signal represented by graph C contributes −90° to the summer 38 to give a vectorial sum of −135°. From $t=3$ until $t=4$, the in-phase and quadrature signals corresponding respectively to the graphs A and C contribute respectively phases of 0° and −90° which combine vectorially to produce a resultant phase of −45° as is shown in graph D. Continuing in this fashion, it is seen that the graph D portrays the phase states of the signal on line D of FIG. 1 produced by transitions in the logic levels of the signals on lines A and C.

In accordance with the teachings of the invention, it is noted that the phase transitions portrayed in graph D never exceed quantum jumps in excess of 90°. In this context, it is noted that a phase jump of +135° to −135° sum to 270° which is equal vectorially to 90°. For example, from a time immediately after $t=2$ to a time immediately after $t=4$, in which both the signals of graphs A and C drop from logic states of 1 to logic states of 0, the resultant phase of graph D shifts 180° in two steps of 90° each. In the absence of the delay unit 40 of FIG. 1, the signal of graph C would coincide with the signal of graph B in which case the phase transition from −135° to +45° would occur with a quantum jump of 180° rather than the two steps of 90° each. In this way, the delay unit 40 provides the 90° phase jumps which appear in the signal on line D.

Returning to FIG. 1, a further feature of the invention is also seen in the graph 50. Two paths, a horizontal path 59H and a vertical path 59V, are drawn from the tip of the first quadrant vector representing a +45° phase shift respectively to the tips of the second and fourth quadrant vectors representing phase shifts of +135° and −45°. No transition from one phase state to a second phase state occurs along a path through the origin of the graph 50. A radius vector drawn to a path joining the tips of vectors in adjoining quadrants, such as the path 59H, has a magnitude which does not drop below a factor of $1/\sqrt{2}$ times the maximum amplitude of the vector. Thus, during a transition in phase, the signal power does not drop before one-half its value at any of the four phase states shown in the graph 50, while in systems of the prior art, transitions through the origin can occur with the power dropping to zero.

The system 20 is seen to further comprise a mixer 60 for heterodyning the signal on line D with an X-band carrier provided by an oscillator 62 to translate the signal of line D from the carrier at intermediate frequency to an X-band carrier appearing at the output of the mixer 60 on line 64. The system 20 also comprises an amplifier 66, two antennas 68 and 70 which form a microwave radio link 72 and a receiver 74. The amplifier 66 couples signals from the mixer 60 to the antenna 68 and amplifies the power of the signal on line 64 to a suitable value for transmission from the antenna 68 and reception by the antenna 70 and receiver 74. The receiver 74 comprises well known circuitries such as that disclosed in the aforementioned book by Bennett and Davey for demodulating the phase modulated carrier to recover the original digital data signals of the sources 22 and 24.

It is has been found that an amplifier comprising a microwave oscillator having oscillations which can be phase locked to the phase of the carrier on line 64 conveniently provides adequate power for transmission via the radio link 72. The amplifier 66 includes one such phase locked oscillator 75 which is known as an injection locked oscillator and is seen to comprise a diode 76 mounted within a waveguide 78 and has a direct current bias impressed therethrough by a power supply 80. The construction of an injection-locked oscillator is taught in an article entitled "Integrated Electronically Tuned X-Band Power Amplifier Utilizing GUNN and IMPATT Diodes" by D. C. Hanson and W. W. Heinz in the IEEE Journal of Solid State Circuits, Volume SC-8, February 1973, pages 3–14. The oscillator 75 is tuned to oscillate at a frequency equal to that of the X-band carrier signal on line 64. The quantum phase shifts of the signal on line 64 are of a sufficiently small magnitude, the aforementioned 90° transitions, to permit the phase shifts to be accurately tracked by the phase locked oscillator 75 of the amplifier 66. Thereby, the amplifier 66 precisely reproduces the phase modulation while amplifying the power of the signal on line 64.

It is understood that the above-described embodiment of the invention is illustrative only and that modifications thereof may occur to those skilled in the art. Accordingly, it is desired that this invention is not to be limited to the embodiment disclosed herein but is to be limited only as defined by the appended claims.

What is claimed is:

1. A system for transmitting quaternary phase-modulated signals obtained from binary data signals of first and second sources thereof, the system comprising:
   - means for delaying data of said second source relative to data of said first source by an amount equal to approximately one-half of the duration of one bit of said data;
   - first means for phase modulating said data of said first source on a carrier signal;
   - second means for phase modulating said delayed data on a second carrier signal having a phase quadrature relation to said first carrier signal; and
   - means coupled to said first and said second phase modulating means for amplifying the sum of the outputs of said first and said second modulating means, said amplifying means comprising phase-locking oscillator means.

2. A system according to claim 1 wherein said phase locking oscillator means is an injection-locked oscillator.

3. A system according to claim 2 further comprising an oscillator coupled to said first phase modulating means for providing said first carrier thereto, and a phase shifter coupled between said oscillator and said second phase modulating means for providing said second carrier, said phase shifter imparting a phase shift of 90° between said first carrier and said second carrier.

4. An amplifying system utilizing an amplifier capable of amplifying a phase modulated signal if, and only if, the magnitudes of phase transitions in said phase modulated signal are less than 180°, said amplifying system comprising:
   - said amplifier;
   - a first modulator for phase modulating a first carrier with digital data of a first data source, said modulator providing phase shifts of 0° and 180° corresponding to logic states of a digital signal of said first source;
   - a second modulator for phase modulating a second carrier having the same frequency as said first carrier with digital data of a second data source, said second moludator providing phase shifts of 0° and 180° corresponding to logic states of a digital signal of said second data source;
   - means for shifting the phase of said first carrier relative to the phase of said second carrier by 90°, said signal of said first data source having transitions in logic state which occur simultaneously with transitions in logic state of which occur simultaneously with transitions in logic state of a digital signal of said second data source;
   - means coupled between said second data source and said second modulator for delaying digital signals by an interval of time equal to one-half the duration of one bit of the digital data of said second source whereby a transition in the phase of an output signal of said second modulator can occur at the midpoint between two transitions in phase of an output signal of said first modulator; and
   - means for summing together the signals produced by said first modulator and said second modulator to produce a sum signal thereof, said summing means being coupled to said amplifier for amplifying said sum signal.

5. In combination:
   - means for delaying a second digital signal relative to a first digital signal by an interval equal to approximately one-half the duration of one bit of said second signal, the bit repetition frequency of said second signal being equal to the bit repetition frequency of said first signal;
   - first means for phase modulating said first signal on a first carrier signal;
   - second means coupled to said delaying means for phase modulating said delayed second signal onto a second carrier signal having a phase quadrature relation to said first carrier signal; and
   - means coupled to said first and said second phase modulating means for amplifying the sum of output signals produced by said first and said second modulating means.

* * * * *

UNITED STATES PATENT OFFICE
CERTIFICATE OF CORRECTION

Patent No. 4,006,418          Dated February 1, 1977

Inventor(s) Nathan A. Liskov, William J. Bickford & Paul J. Tanzi

It is certified that error appears in the above-identified patent and that said Letters Patent are hereby corrected as shown below:

Column 6, line 16, delete --which occur simultaneously with transitions in logic state of--.

Signed and Sealed this

Third Day of May 1977

[SEAL]

Attest:

RUTH C. MASON
Attesting Officer

C. MARSHALL DANN
Commissioner of Patents and Trademarks